Oct. 31, 1972    D. G. WALL ET AL    3,701,618
PERISTALTIC EXTRUSION PRESS

Filed Jan. 27, 1971    2 Sheets-Sheet 1

INVENTORS
Donald G. Wall
Kenneth N. Temkin

BY
J.A.Cooke    ATTORNEY

INVENTORS
Donald G. Wall
Kenneth M. Temkin

United States Patent Office 3,701,618
Patented Oct. 31, 1972

3,701,618
PERISTALTIC EXTRUSION PRESS
Donald G. Wall, Rte. 1, Box 161–C, Indian Head, Md. 20640, and Kenneth N. Temkin, 5805 Fisher Road, Apt. 201, Oxon Hill, Md. 20031
Filed Jan. 27, 1971, Ser. No. 110,225
Int. Cl. B28b *17/00*
U.S. Cl. 425—192                3 Claims

ABSTRACT OF THE DISCLOSURE

An extrusion press which forces plastic material through a die plate by means of one or more peristaltic pumps each having a hydraulically actuated tubular elastomeric diaphragm as the pumping element. The peristaltic pumps are used either singly or in series to feed material directly through a die plate, or are connected in groups of series-connected pumps to feed a plenum chamber containing the die plate. Pump lining sleeves facilitate cleaning and protect the diaphragms against corrosion. Perforated plates positioned between series-connected pumps facilitate straining and mixing of the plastic material.

---

The invention described herein may be manufactured and used by or for the Government of the United States of America for governmental purposes without the payment of any royalties thereon or therefor.

BACKGROUND OF THE INVENTION

This invention relates generally to extrusion presses and more particularly to extrusion presses for use in safely extruding high energy solid propellants.

In the extrusion of solid propellants, the propellant composition is typically a moldable plastic material and is forced through a die orifice to produce strands or rods of solid propellant. To force the propellant material through the die, previously known extrusion presses have generally employed a metal piston slideably received within a metal cylinder and reciprocal movement of the piston in the cylinder in response to externally applied force, caused the propellant material contained within the cylinder to be extruded through the die. Extrusion presses of this type require the piston to be closely fitted within the cylinder to prevent back flow leakage of the propellant material around the piston and consequently a hazardous zone is created in the small annular clearance between the piston and the cylinder wall. If the propellant material is permitted to enter this hazardous zone during movement of the piston, the propellant is subjected to a high shearing force, which may produce local heat concentrations of sufficient intensity to elevate the propellant to its ignition point. An additional disadvantage of extrusion presses constructed in this manner is that the piston must at all times be maintained in precise axial alignment with the cylinder to prevent metal-to-metal sliding contact of the piston along the cylinder wall. Such extrusion presses are therefore inherently dangerous since the required precise alignment is difficult to achieve and maintain. Any metal-to-metal sliding friction produced between the piston and a cylinder wall may generate sufficient heat to ignite the propellant. Such presses are also limited in the diameter of extruded propellant billets and can only be operated intermittently.

Other extrusion presses, constructed in accordance with U.S. Pat. No. 3,262,155, have contemplated a cup-shaped resilient diaphragm for receiving the propellant material in the cylinder, the propellant being displaced from the cylinder by means of hydraulic ram pressure acting upon the diaphragm. Such presses eliminate metal-to-metal sliding friction but are not satisfactory under all conditions of operation since they displace only a portion of the diaphragm volume and are only capable of intermittent operations inasmuch as the cup-shaped diaphragm must always be reloaded after each stroke of the hydraulic ram.

SUMMARY OF THE INVENTION

It is therefore an object of the present invention to provide a new and improved extrusion press which affords a maximum degree of safety in the production of high energy solid propellants.

Another object of the invention is to provide an extrusion press for extruding solid propellants and which is free of metal-to-metal sliding friction between movable parts in the vicinity of the propellant material.

A further object of the invention is to provide an extrusion press capable of extruding larger diameter billets by continual operation without requiring complete shutdown for reloading.

Briefly, in accordance with one embodiment of this invention, these and other objects are attained by providing an extrusion press in which a peristaltic pump is employed to force the extrusion material through a die. The peristaltic pump includes a tubular elastomeric diaphragm adapted to receive plastic-like material therein, and, upon application of hydraulic pressure on the exterior of the tubular diaphragm, the diaphragm is forced to collapse inwardly and thereby displace the plastic material from within the diaphragm and force the plastic through the extrusion die. The diaphragm is constructed so that, when subjected to external hydraulic pressure, the diaphragm first collapses at that end which is farthest from the extrusion die and then progressively collapses toward the die, which type of diaphragm will be hereinafter referred to as peristaltic diaphragm, thereby displacing all of the plastic material from within the tubular diaphragm through the die.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENTS

Figure 1:
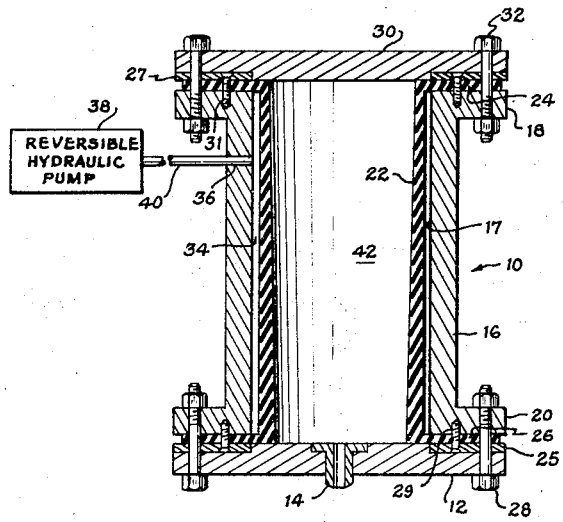
FIG. 1 is a cross-sectional view of a single stage extrusion press constructed in accordance with one embodiment of the present invention.

Referring now to the drawings, and more particularly to FIG. 1 thereof, a single stage peristaltic extrusion press is shown as consisting essentially of a peristaltic pump 10 connected to a circular extrusion die plate 12 having an extrusion die 14 centrally formed therein. The peristaltic pump includes a cylindrical casing 16 having a cylindrical bore 17 extending longitudinal therethrough and upper and lower outwardly projecting annular flanges 18 and 20 integrally formed on opposed ends of the casing 16. Concentrically positioned within the casing is a tubular diaphragm 22 extending longitudinally throughout the length of the axial bore formed in the casing 16. The diaphragm is constructed of an elastomeric material such as natural or synthetic rubber compositions and is provided with integrally formed outwardly projecting annular flanges 24 and 26 at the upper and lower extremities thereof, respectively. The lower diaphragm flange 26 is sealingly clamped to the lower pump casing flange 20 by means of a flat annular ring 25 which is secured to flange 20 by a plurality of peripherally disposed screws 29 while the upper diaphragm flange 24 is sealingly clamped to casing flange 18 by a similar annular ring 27 and screws 31. The die plate 12 is secured to the casing flange 20 by a plurality of peripherally disposed bolts 28 extending through aligned apertures formed in the die plate, the ring 25 and flange 20; while the end plate 30 is sealingly clamped to the upper pump casing flange 18 by means of a plurality of peripherally disposed bolts 32 extending through aligned apertures formed in the end plate 30, ring 27 and the casing flange 18. It is understood that, when extruding propellants, it may be desirable to use conventional shear bolts for bolts 28 and 32.

Since the tubular diaphragm is sealingly secured to the upper and lower flanges of the pump casing by means of the end rings 27 and 25, respectively, a closed expansible chamber 34 is formed in the annular space between the pump casing 16 and the tubular diaphragm 22. A reversible hydraulic pump 38 is in fluid communication with the expansible chamber 34 by means of a pipe 40 coupled to a transverse through aperture 36 formed in the sidewall of the pump casing. A pump working chamber 42 is defined by the internal wall of the tubular diaphragm 22, the end plate 30 and die plate 12. The end plate 30 may be removed for the purpose of filling the working chamber 42 with plastic-like material, such as a propellant, to be extruded through the die 14 and, after the working chamber has been filled, the end plate 30 is sealingly secured to the casing flange 18 by the bolts 32. Hydraulic fluid under pressure is then introduced into the expansible chamber 34 between the diaphragm 22 and the pump casing 16 by the hydraulic pump 38. Hydraulic pressure acting upon the exterior of the diaphragm causes the elastomeric diaphragm to stretch and collapse and thereby displace the material from the working chamber 42 through the die 14. It will be noted that the peristaltic pump diagram in the embodiment shown in FIG. 1 is constructed such that the diaphragm wall is thinner at its upper end than at the lower end adjacent the die plate so that, when subjected to exernal hydraulic pressure in the expansible chamber 34, the diaphragm will be caused to collapse first at the upper end thereof adjacent to the end plate 30 and then progressively collapse toward the die plate 12.

Figure 2:
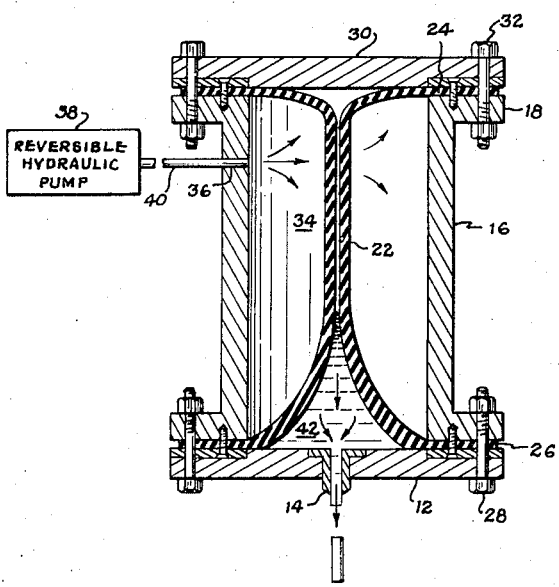
FIG. 2 is a cross-sectional view showing the operation of the single stage extrusion press.

This peristaltic operation of the diaphragm is more clearly illustrated in FIG. 2 wherein hydraulic fluid has been introduced into the expansible chamber 34 between the diaphragm 22 and the pump casing 16 and the diaphragm has initially collapsed at its uppermost end and displaced the plastic-like material from the uppermost portion of the working chamber 42. It will be seen that upon continued hydraulic pressurization of the expansible chamber 34, the diaphragm 22 will continue to collapse progressively toward the die plate 12, beyond the position illustrated in FIG. 2, to further reduce the volume of the working chamber 42 and whereby extrude the remainder of the plastic-like material contained in the working chamber through the die 14. After substantially all of the plastic material has been displaced from the working chamber 42 and extruded through the die 14, the hydraulic fluid is removed from the expansible chamber 34 by reversal of the hydraulic pump 38, thus permitting the resilient diaphragm to contract to its initial position shown in FIG. 1, at which time the extrusion press is readied for refilling with a new charge of plastic material for a subsequent extrusion operation. By this construction, plastic-like material such as solid propellants, may be extruded through a die without being subjected to the hazardous metal-to-metal sliding friction heretofore characteristic of previous extrusion presses and refilling of the working chamber with a new charge of plastic material is readily accomplished since the diaphragm automatically returns to its initial position upon removal of external hydraulic pressure.

Figure 3:
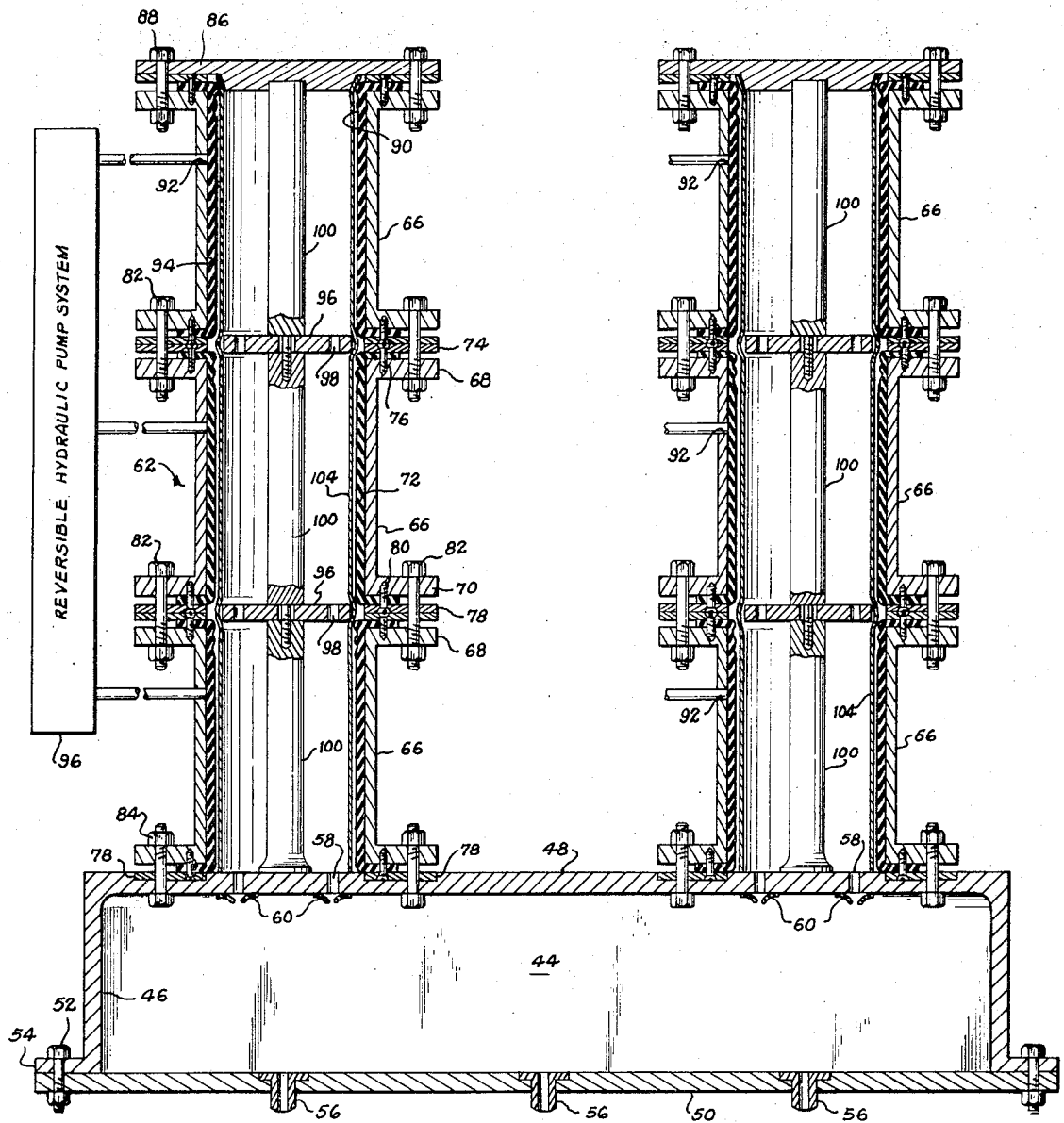
FIG. 3 is a cross-sectional view of a multi-stage continuous operation extrusion press constructed in accordance with another embodiment of the present invention.

Referring now to FIG. 3, wherein a peristaltic extrusion press capable of continuous operation is illustrated, this embodiment includes a circular plenum chamber 44 defined by a cylindrical sidewall 46, an integrally formed circular flat top wall 48 and a removable circular die plate 50 which is sealingly mounted upon the plenum chamber by means of a plurality of peripherally disposed bolts 52 extending through aligned apertures formed in the die plate and in an annular flange 54 integrally formed on the plenum chamber sidewall 46. The die plate has a plurality of extrusion dies 56 mounted in die receiving apertures formed therein through which plastic-like material under pressure in the plenum chamber is extruded. Although only three extrusion die orifices have been illustrated, it is to be understood that any suitable number of extrusion dies may be formed in the die plate.

The top plate 48 of the plenum chamber has a plurality of inlet apertures 58 formed therein through which plastic-like material may be introduced into the plenum chamber by peristaltic pump assemblies. Each of the inlet apertures 58 into the extrusion plenum chamber is provided with a one way check valve 60 which permits flow into the plenum chamber and prevents flow out of the plenum chamber through apertures 58. The check valves may be of any suitable design such as the flexible elastomeric flapper valves, as illustrated, or any other suitable one way valve structure.

Plastic-like material, such as a solid propellant, is fed into the plenum chamber by first and second series connected peristaltic pump assemblies 62 and 64. Although only two series connected pump assemblies are shown, it is understood that any suitable number of pump assemblies may be mounted upon the top plate 48 of the plenum chamber for purposes of feeding the plastic-like materials into the plenum chamber. As shown, each pump assembly is positioned above respective plenum chamber inlet apertures 58 whereby the contents of the pumps may be fed into the interior of the plenum chamber. Each pump assembly consists of a plurality of hollow cylindrical pump casings 66 having upper and lower outwardly projecting annular flanges 68 and 70 formed thereon respectively. Concentrically positioned within each pump casing 66 is a tubular elastomeric diaphragm 72, each diaphragm being sealingly clamped to its respective upper casing flange 68 by a flat annular ring 74 by a plurality of peripherally disposed clamping screws 76. Each diaphragm is similarly clamped to its respective lower pump casing flange 70 by a similar flat annular ring 78 by means of a plurality of peripherally disposed clamping screws 80, thus permitting assembly and disassembly of pumps without loss of hydraulic fluid. Each series connected peristaltic pump assembly, 62 and 64, is formed by a plurality of such pumps having their casings 66 sealingly connected together in coaxial alignment and being rigidly secured in this position by a plurality of peripherally disposed bolts 82 extending through aligned apertures formed in the lower pump casing flange 70 of one pump and through the upper pump casing flange 68 in the adjacent pump. Each pump assembly is sealingly mounted upon the top plate 48 of the plenum chamber by a plurality of peripherally disposed bolts 84 extending through aligned apertures formed in the lower flange of the lowermost pump casing 66 and similar apertures formed in the top plate 48 of the plenum chamber. The uppermost pump of each series connected pump assembly is closed by a circular end plate 86 which is sealingly mounted across the upper end of the uppermost pump by means of a plurality of peripherally disposed bolts 88 extending through aligned apertures formed in the pump casing's upper flange and the end plate.

In the embodiment shown in FIG. 3, the tubular diaphragms are provided with one or more annular internal grooves 90 formed therein adjacent the uppermost end of each diaphragm for the purpose of reducing the thickness of the diaphragm at the location of the grooves to cause the diaphragm to collapse initially, under external hydraulic pressure, in the vicinity of the annular grooves. Each pump casing 66 has a through aperture 92 formed in the sidewall thereof to facilitate introduction of hydraulic fluid under pressure into an annular expansion chamber 94 between the wall of the pump casings 66 and the tubular diaphragms 72. Each of the hydraulic inlet apertures 92 is coupled to a reversible hydraulic pump system 96 by which any one or more of the annular expansion chambers 94 may be selectively filled with hydraulic fluid under pressure to collapse the respective tubular diaphragm and may be selectively evacuated of hydraulic fluid to permit the respective diaphragm to contract to its initial position. The particular hydraulic pump structure and valving arrangement of the reversible hydraulic pump system 96 does not form a part of the present invention and therefore the structural details thereof need not be described.

The operation of the embodiment illustrated in FIG. 3 will be described in connection with the first peristaltic pump assembly 62 in which three peristaltic pumps have been connected in series. After filling the interior of each of the three series connected diaphragms 72 with propellant or other plastic-like material, from a hopper or other suitable reservoir, the end plate 86 is sealingly mounted upon the uppermost pump and hydraulic fluid under pressure is then introduced into the expansible chamber 94 surrounding the uppermost diaphragm causing the diaphragm to collapse first in the vicinity of the annular grooves 90 at the uppermost end thereof and then to collapse progressively downwardly toward the lower end of the diaphragm under the continued application of hydraulic fluid under pressure, thus displacing the contents of the diaphragm in the uppermost pump downwardly into the middle or intermediate pump. Displacement of the contents of the uppermost pump into the intermediate pump causes displacement of the contents of the intermediate and lowermost pump downwardly causing a predetermined volume of material to be fed into the plenum chamber, that volume being equivalent to the volume of material displaced by the uppermost pump. Then, while maintaining hydraulic pressure on the uppermost diaphragm, hydraulic pressure is next introduced into the expansible chamber 94 surrounding the diaphragm 72 in the intermediate pump, causing that diaphragm to similarly displace its contents downwardly and further feed the plenum chamber. Upon displacement of the contents of the intermediate pump, the intermediate pump is maintained under pressure and hydraulic fluid then introduced into the expansible chamber 94 surrounding the diaphragm 72 in the lowermost pump, causing the contents thereof to be similarly fed through the inlet apertures 58 into the plenum chamber 44. At this time, the second series connected peristaltic pump assembly 64 may be operated in the manner previously described in reference to the first pump assembly 62 and, it will be apparent to the reader, that while the three pumps of the second pump assembly are discharging their contents into the plenum chamber, the first pump assembly 62 may be recharged for subsequent pumping action. It will also be apparent that, once the intermediate diaphragm of the intermediate pump has been fully collapsed, the end plate 86 may be removed and the uppermost chamber recharged with plastic material. By this operation, plastic material may be continually fed into the plenum chamber by one or more of the series connected peristaltic pump assemblies while other pump assemblies are being refilled, thus enabling continuous extrusion of propellant material through a plurality of extrusion dies 56 formed in the die plate 50 of the plenum chamber. It is to be understood, of course, that each of the peristaltic pump assemblies, such as 62 and 64, may include more series connected pumps than the three pumps illustrated.

It is evident therefore that the FIG. 3 embodiment of the present invention provides a continual operation peristaltic extrusion press which enables large quantity production of extruded solid propellants while eliminating any hazardous metal-to-metal sliding friction heretofore characteristic of previous extrusion presses. It is also understood that with certain extruded materials, it may be necessary to employ heat exchangers either within or surrounding the plenum chamber to maintain the material in its plastic-like condition to prevent solidification of the material within the plenum chamber prior to extrusion through the dies 56.

When straining and/or mixing of the plastic-like material during pumping operation is desired, the present invention includes a plurality of circular plates 96 having through apertures 98 formed therein and being supported transversely in the series connected pump assembly by a plurality of spacer rods 100. The spacer rods are threadedly connected together and provide a mounting support for the mixing plates 96 and are of such length as to support plates 96 at the interface of adjacent pump assemblies, thereby preventing interference with the operation of the diaphragms. The lowermost shaft 100 rests upon the top plate 48 of the plenum chamber while the top or uppermost shaft engages the lower surface of end plate 86 to support the shafts and mixing plates coaxially within the series connected pump assembly. The mixing plates and supporting spacer rods assemblies may be removed and replaced as desired simply by removing the end plate 86.

Since certain solid propellant compositions may be corrosive to certain elastomeric diaphragm materials while other explosive propellant compositions may be corrosive to other elastomeric diaphragm materials, the present invention includes a tubular elastomeric liner sleeve 104 having a diameter slightly less than the inner diameter of the diaphragms 72 and having an axial length equal to the total length of the series connected pump assembly. The liner sleeve prevents contact of the solid propellant with the diaphragm, without interfering with the normal operation of the diaphragm, and therefore the elastomeric diaphragm material may be selected so as to be resistant to corrosion by the hydraulic pumping fluid without regard to resisting corrosion by the particular propellant material being extruded. The present invention may therefore be used to extrude various propellant materials by merely changing the liner sleeve and thereby eliminating the need to replace all of the diaphragms in each series connected pump assembly when different explosive compositions are extruded. The liner sleeve additionally performs the function of simplifying the cleaning of the series connected pump assembly since removal of the sleeve after an extrusion operation leaves the interior of the pump assembly clean and free of contaminants. It is to be understood that the liner sleeve may also be used in the embodiment shown in FIGS. 1 and 2.

Figure 4:
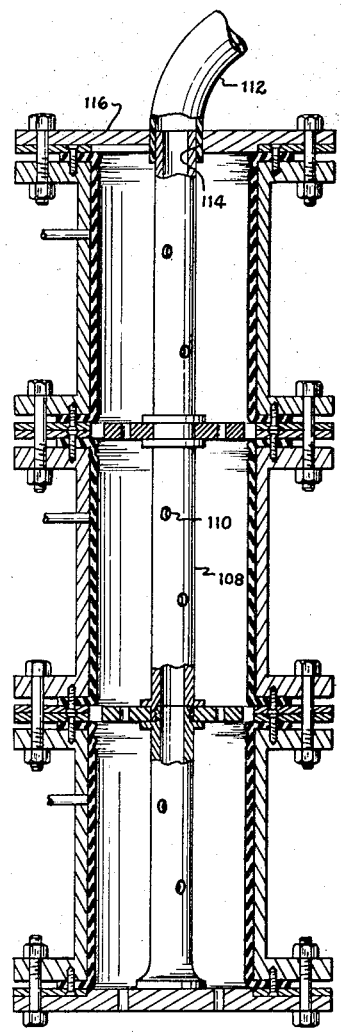
FIG. 4 is a cross-sectional view of a multi-stage press constructed in accordance with another embodiment of the present invention.

Referring now to FIG. 4 which illustrates one series connected peristaltic pump assembly 106 similar to the assemblies 62 and 64 in FIG. 3, the mixing or straining plates 96 in this embodiment are supported within the pump assembly 106 by a plurality of hollow pipes 108. Pipes 108 have a plurality of perforations 110 formed therein and are threadedly coupled together and are in open fluid communication with one another through the threaded couplings. The uppermost pipe is sealingly attached to a flexible hollow tube 113 which extends through an aperture 114 formed in end plate 116 which is clamped to the casing by bolts or other suitable means. By this construction, one or more of the pump chambers may be evacuated by connecting the flexible tube 112 to a vacuum source. This embodiment may also be used to introduce liquids, as desired, into the pump assemblies during the extrusion process by pumping liquid through the flexible tube 112 and into the perforated pipes 108.

It will be apparent that, although the present invention has been described in connection with the extrusion of solid propellants, in which application the present invention offers unique and improved safety characteristics, it is apparent that the invention may be used in the extrusion of numerous other plastic-like materials. It is further understood that the peristaltic diaphragm may be constructed to progressively collapse from its inlet end toward its discharge end, by various configurations and structures other than the variable thickness structure of the FIG. 1 embodiment and the annular groove embodiment of FIG. 3. Moreover, it is contemplated that two peristaltic pumps of the type shown in FIG. 1 may be coupled together at their discharge ends 26 without a die plate therebetween for purposes of mixing explosives or other materials by alternately pumping the explosive back and forth between them.

Obviously, numerous modifications and variations of the present invention are possible in light of the above teachings. It is therefore to be understood that within the scope of the appended claims the invention may be practiced oherwise than as specifically described herein.

What is claimed as new and desired to be secured by Letters Patent of the United States is:

1. A peristaltic press for extruding plastic-like material comprising:
    a die plate having at least one extrusion die orifice formed therein,
    a peristaltic pump having at least one tubular elastomeric diaphragm adapted to be inwardly compressed progressively from an inlet end toward a discharge end to displace said material into said extrusion die orifice,
        said peristaltic pump further at least one elongate cylindrical housing having external annular flanges formed on the extremities and having a cylindrical axial bore extending longitudinally therethrough and a transverse aperture formed in the sidewall thereof,
        said tubular elastomeric diaphragm concentrically positioned within said housing and extending longitudinally throughout the length of the axial bore therein,
        means for sealingly clamping each end of said diaphragms to said flanges,
        whereby a plurality of pump housings may be serially connected in sealed relationship with their longitudinal axes aligned and with the discharge end of each diaphragm adjacent the inlet end of the next diaphragm,
    a removable end plate sealingly engaged across the inlet end of the first housing,
    a hollow perforated pipe positioned coaxially within said housing, and
    perforated plates mounted on said perforated pipe extending transversely in said longitudinal bores and lying in planes containing the intersecting faces of adjacent housings.

2. A peristaltic press according to claim 1 further comprising a tubular elastomeric liner received within each of said pump assemblies and extending throughout the longitudinal length thereof.

3. The peristaltic press according to claim 1 further comprising: a flexible hollow tube sealingly coupled to said perforated pipe and extending through an aperture extending through said end plate and being adapted to be coupled to a vacuum source or a fluid source.

References Cited
UNITED STATES PATENTS

| | | | |
|---|---|---|---|
| 720,902 | 2/1903 | Du Brau | 18—12 R |
| 2,291,912 | 8/1942 | Meyers | 417—474 X |
| 2,262,989 | 11/1941 | Conklin et al. | 18—12 SS X |
| 3,518,033 | 6/1970 | Anderson | 417—478 |

H. A. KILBY, Jr., Primary Examiner

U.S. Cl. X.R.

417—474, 478; 425—376, 382